United States Patent
Zhou et al.

(10) Patent No.: US 12,482,054 B2
(45) Date of Patent: Nov. 25, 2025

(54) MULTI-PASS WRITEBACK WITH SINGLE-PASS DISPLAY CONSUMPTION

(71) Applicant: ATI TECHNOLOGIES ULC, Markham (CA)

(72) Inventors: Jie Zhou, Markham (CA); Wing-Chi Chow, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 260 days.

(21) Appl. No.: 17/957,105

(22) Filed: Sep. 30, 2022

(65) Prior Publication Data

US 2024/0112294 A1    Apr. 4, 2024

(51) Int. Cl.
| | |
|---|---|
| *G06T 1/20* | (2006.01) |
| *G06T 1/60* | (2006.01) |
| *G09G 3/20* | (2006.01) |
| *G09G 5/393* | (2006.01) |

(52) U.S. Cl.
CPC .......... *G06T 1/20* (2013.01); *G06T 1/60* (2013.01); *G09G 3/2096* (2013.01); *G09G 5/393* (2013.01); *G09G 2340/0414* (2013.01); *G09G 2350/00* (2013.01); *G09G 2360/12* (2013.01)

(58) Field of Classification Search
CPC ........... G06T 1/20; G06T 1/60; G06T 15/005; G09G 3/2096; G09G 5/393; G09G 5/397; G09G 2340/0414; G09G 2340/12; G09G 2350/00; G09G 2352/00; G09G 2360/12
USPC ................................ 345/502, 505, 545, 506
See application file for complete search history.

(56) References Cited

U.S. PATENT DOCUMENTS

| | | | |
|---|---|---|---|
| 6,864,894 B1 * | 3/2005 | Lefebvre | G06F 3/14 345/506 |
| 2005/0041031 A1 * | 2/2005 | Diard | G09G 5/393 345/505 |
| 2018/0095677 A1 * | 4/2018 | Chrobak | G09G 5/393 |
| 2023/0368714 A1 * | 11/2023 | Sharma | G09G 5/393 |

\* cited by examiner

*Primary Examiner* — Jacinta M Crawford

(57) ABSTRACT

Techniques described herein allow multi-pass writeback processing of graphical frames (such as those having a high or ultrahigh resolution) to reduce bandwidth for display operations by, for example, splitting an input stream for processing by separate graphical pipelines as two or more spatially segmented portions. After receiving a graphical frame for processing, the graphical frame is spatially segmented into multiple portions. Each of the multiple portions is provided to a respective graphical pipeline of a plurality of graphical pipelines for processing. Each processed portion of the graphical frame is written substantially simultaneously to a corresponding portion of a system memory.

22 Claims, 7 Drawing Sheets

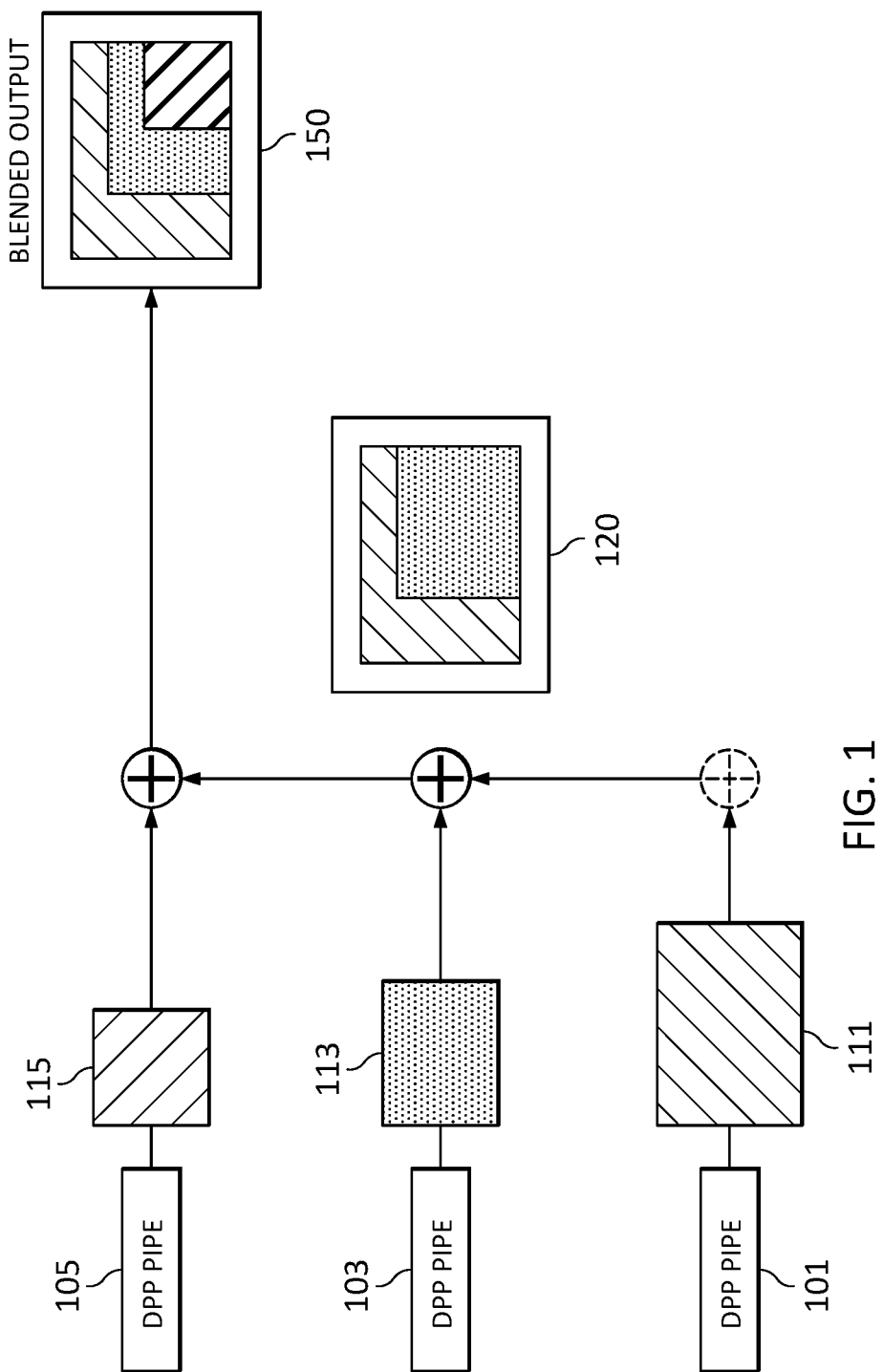

MULTI-PASS WRITEBACK WITH SINGLE-PASS DISPLAY CONSUMPTION

BACKGROUND

When processing high-resolution or ultrahigh-resolution graphical content for display, such as graphical images and/or video content, the bandwidth requirements associated with correspondingly high pixel transfer rates may approach or exceed limitations of the particular circuitry and processors tasked with such processing. It would therefore be advantageous to lessen such bandwidth requirements when processing high-resolution or ultrahigh-resolution graphical content.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 illustrates an example of combining overlapping display layers into a blended output by a multi-pipe/plane combiner (MPC) circuitry module in accordance with some embodiments.

FIGS. 3-1 and 3-2 illustrate a top-level schematic view of a multi-pipe/plane combiner (MPC) circuitry module in accordance with some embodiments.

DETAILED DESCRIPTION

FIGS. 1-6 illustrate techniques for allowing multi-pass writeback processing of graphical frames (such as those having a high or ultrahigh resolution) to reduce bandwidth for display operations by, for example, splitting an input stream for processing by separate graphical pipelines as two or more spatially segmented portions. A multi-pipe/plane combiner (MPC) circuitry module (referred to herein as an MPC module) accepts selectable inputs from individual display pixel processing (DPP) pipelines of a graphics processing system and selectively provides combined output to a display controller and/or via a display writeback (DWB) memory interface in the graphics processing system. In certain embodiments, the MPC module may be incorporated in one or more other components and/or systems, such as a graphical processing unit (GPU), graphical processing device or subsystem, video controller, display controller, etc.

An ultrahigh resolution input stream (such as video content with a resolution of 7680×4320, commonly termed 8K resolution) utilizes a correspondingly high pixel rate (e.g., approximately 2.3 megapixels per second) that may exceed hardware bandwidth limitations, such as those associated with each DPP pipeline. As one example of functionality provided by an MPC module in accordance with one or more embodiments, if performance of one DPP pipeline is insufficient for supporting display output timing (e.g., due to throughput limitations, power objectives, etc.), the MPC module spatially segments the graphical frames being processed (e.g., one or more graphical frames of a desktop image or video stream) into multiple portions for parallel processing and writeback. Each portion is assigned to a distinct DPP pipeline, with the processed portions being combined to form a final complete output plane.

For example, in certain embodiments and scenarios, an 8 k resolution input stream of 7680×4320 pixels is split horizontally and processed in a parallel manner as two 4 k input streams of 3840×4320 pixels each. Each portion is processed in a parallel manner by a separate DPP pipeline and combined via an MPC module such that each portion is substantially simultaneously scanned to a display writeback (DWB) memory interface, such as to provide the resulting processed entirety of the graphical frame to a frame buffer, to a DWB buffer, and/or other location within system memory. In this manner, parallel writeback processing by the MPC system enables a single graphical frame to be processed in parallel by multiple DPP pipelines, each performing its own writeback pass.

Figures 1, 3:
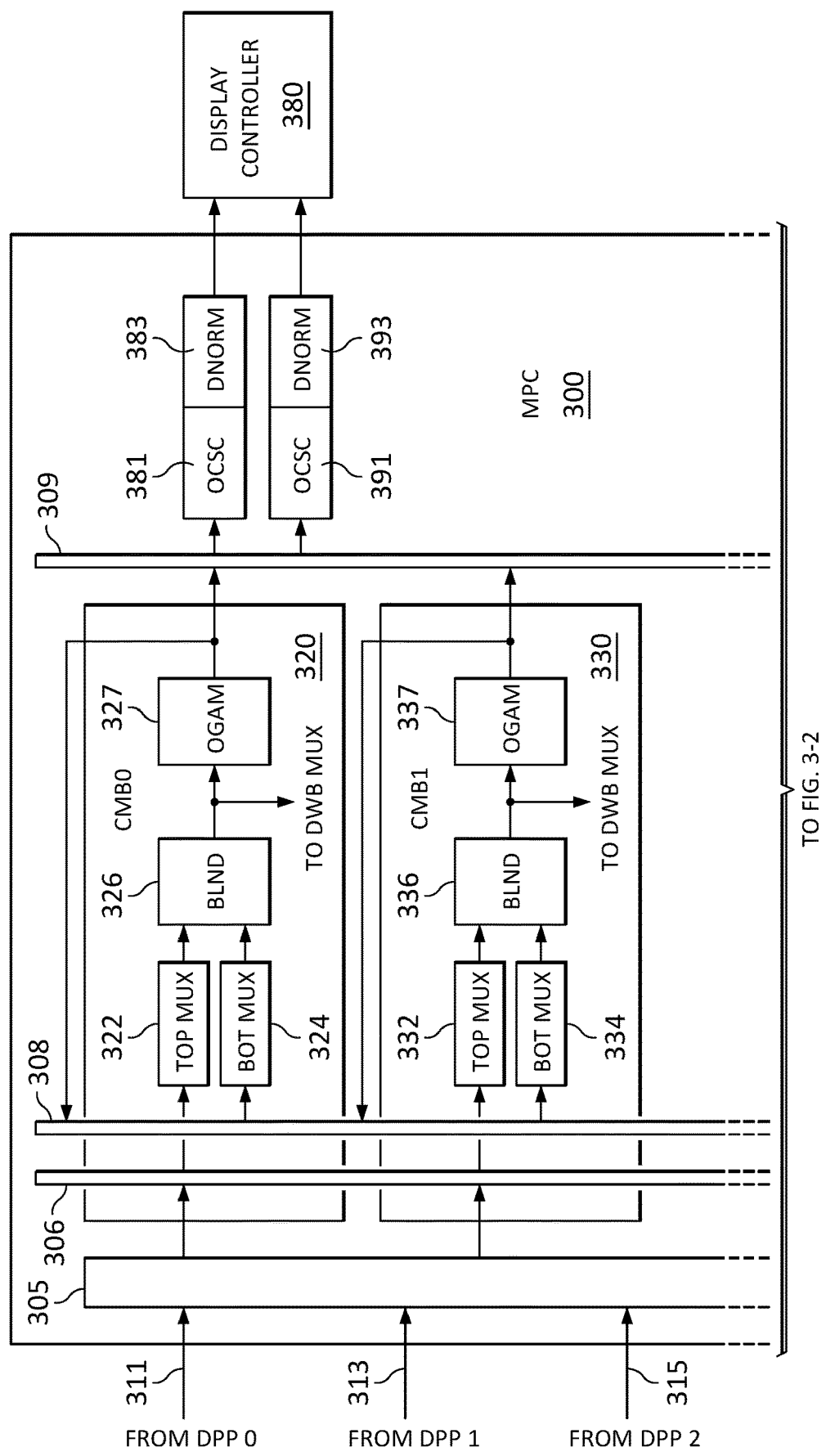
Figures 2, 3:
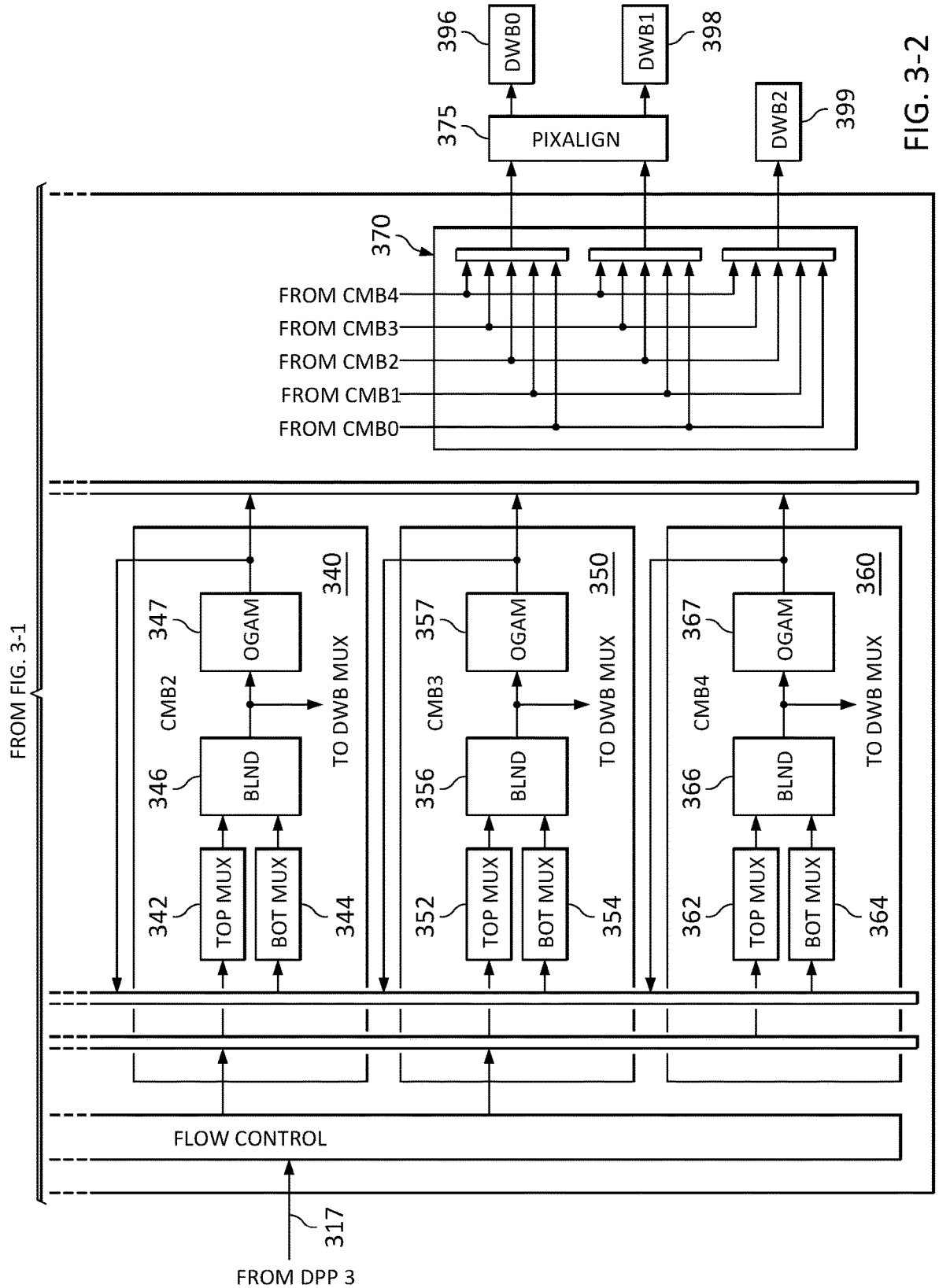

FIG. 1 illustrates an example of blending three overlapping display layers 111, 113, 115, each processed by a corresponding separate DPP pipeline (DPP pipelines 101, 103, 105, respectively) and combined into a blended output 150 by an MPC module in accordance with some embodiments (e.g., MPC module 300 of FIG. 3, described below). In particular, DPP pipeline 101 processes display layer 111, DPP pipeline 103 processes display layer 113, and DPP pipeline 105 processes display layer 115. In the illustration of FIG. 1, the MPC module 300 combines (e.g., additively composites) display layers 111 and 113 to form the resulting intermediate display layer 120, which is combined with display layer 115 to form the blended output 150. It will be appreciated that although the intermediate display layer 120 is depicted here as a visualization aid, in one or more embodiments the MPC module 300 generates the blended output 150 without generating any such intermediate display layer.

Figure 2:
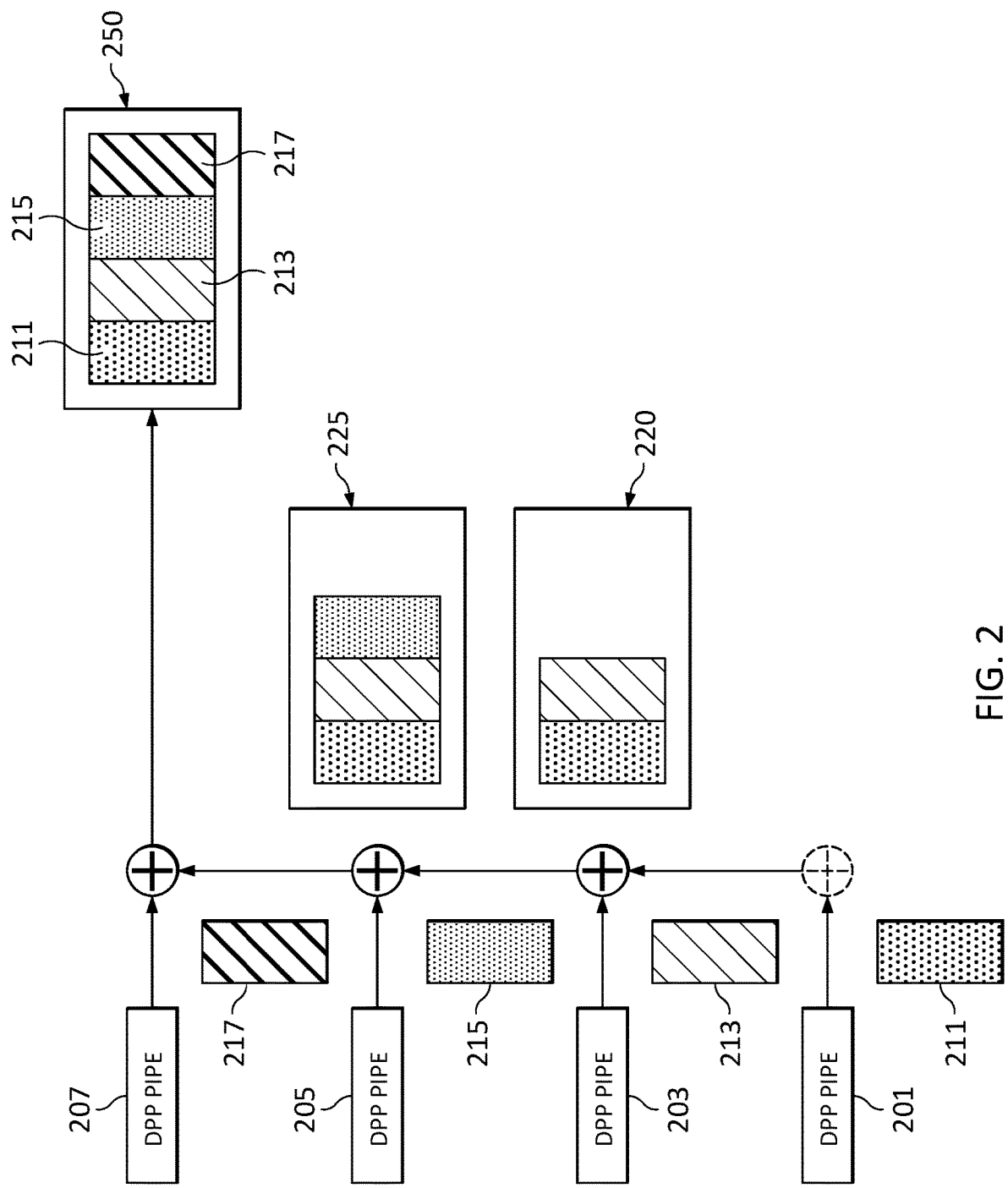
FIG. 2 illustrates an example of combining non-overlapping display layers into a blended output by a multi-pipe/plane combiner (MPC) circuitry module in accordance with some embodiments.

FIG. 2 illustrates an example of blending four non-overlapping display layers 211, 213, 215, 217, each processed by a corresponding separate DPP pipeline 201, 203, 205, 207, respectively, and combined into a blended output 250 by an MPC module (again, such as MPC module 300 of FIG. 3 below) in accordance with some embodiments. In this scenario, each of the display layers 211, 213, 215, 217 represent non-overlapping horizontally segmented portions of a larger graphical frame. In a manner similar to that described above with respect to the blended output 150 of FIG. 1, display layers 211 and 213 are respectively processed by DPP pipeline 201 and 203, and combined by the MPC module 300 to produce intermediate display layer 220; display layer 215 is processed by DPP pipeline 205 and combined with intermediate display layer 220 to produce intermediate display layer 225; and display layer 217 is processed by DPP pipeline 207 and combined with intermediate display layer 225 to produce blended output 250. As noted above with respect to FIG. 1, in certain embodiments the combining of two or more display layers may include additively compositing those display layers. Also as noted above, although the intermediate display layers 220 and 225 are depicted here as visualization aids, in one or more embodiments the MPC module 300 generates the blended output 250 by generating fewer intermediate display layers, one or more additional intermediate display layers, or without generating any such intermediate display layers.

FIGS. 3-1 and 3-2, which are collectively referred to herein as FIG. 3, illustrate a top-level schematic view of an MPC module 300 in accordance with one or more embodiments. Generally, the MPC module 300 receives outputs from all DPP pipelines and selectively combines them to multiple outputs. In the depicted embodiment, the MPC module 300 receives output from each of four DPP pipelines 311, 313, 315, 317 via flow control interface circuitry 305. In operation, when utilizing two input sources from two different DPP pipelines, the output of each DPP pipeline goes through one of multiple combiner circuitry modules (also referenced herein as combiner modules) 320, 330, 340, 350, 360. A combining function is implemented by the MPC module 300 in some embodiments by blending top and bottom layers using a per-pixel alpha component from the top layer (in which alpha values are taken from each pixel location of the top layer and used for each corresponding pixel location of the resulting blended output) or by using a single global alpha value (e.g., from a register) for each pixel of the resulting blended output. It can also be configured as two DPP pipelines combining to form a final output such that the left half of any scan line comes from one DPP pipeline and the right half of any scan line comes from another DPP pipeline, as discussed elsewhere herein.

In the depicted embodiment, output from the MPC module 300 is communicatively coupled to a display controller 380, as well as to one or more of the DWB scaling modules 396, 398, 399. Each of the DWB scaling modules 396, 398, 399 may be selected via pixel alignment circuitry module 375 and DWB MUX 370. The output from each individual DPP pipeline 311, 313, 315, 317 is selectively provided by flow control interface circuitry 305 to each of multiple combiner modules, each with a top layer multiplexer (MUX) for receiving a top layer and a bottom layer MUX from the inputs available via DPP pipelines 311, 313, 315, 317. In particular, a first combiner module 320 (CMB0) includes a top layer MUX 322 and a bottom layer MUX 324, blending logic 326 to blend the selected top and bottom layers, and output gamma module 327 to apply output gamma correction (an operation used to encode and decode luminance values for a graphical frame or portion thereof, such as by using one or more programmable lookup tables for linear piecewise interpolation). The input to the top layer MUX 322 is selected via control line 306; the input to the bottom layer MUX 324 is selected via control line 308. The output from blending logic 326 is provided both to the output gamma module 327 and to a display writeback (DWB) MUX 370, which selectably receives as input the output from any of the combiner modules 320, 330, 340, 350, 360, and selectively provides that input to one or more of DWB scaling modules 396, 398, 399 for scaling.

In a manner similar to that described above with respect to combiner module 320, combiner module 330 (CMB1) includes top layer MUX 332, bottom layer MUX 334, blending logic 336, and output gamma module 337; combiner module 340 (CMB2) includes top layer MUX 342, bottom layer MUX 344, blending logic 346, and output gamma module 347; combiner module 350 (CMB3) includes top layer MUX 352, bottom layer MUX 354, blending logic 356, and output gamma module 357; and combiner module 360 (CMB4) includes top layer MUX 362, bottom layer MUX 364, blending logic 366, and output gamma module 367. The primary outputs of the MPC module 300 are communicatively coupled to the display controller 380. In particular, output from each of the output gamma modules 327, 337, 347, 357, 367 is selectably (via control line 309) provided to display controller 380 via output color space conversion (OCSC) circuitry module 381 and denormalization module 383 or OCSC circuitry module 391 and denormalization module 393. In operation, the OCSC circuitry modules 381, 391 convert internal red-green-blue (RGB) color space output to a final output color space (such as via matrix transformation or other operations), with denormalization modules 383, 393 (such as via conversion of floating-point output to fixed 12-bit output).

As noted elsewhere herein, if performance of one DPP pipeline is insufficient for supporting display output timing, the graphical frames being processed may be spatially segmented into multiple portions. For example, graphical frames with an 8 k resolution are processed by horizontally segmenting the graphical frames into left and right portions of 4 k resolution each. To support such functionality, the pixel alignment circuitry module 375 (PIXALIGN) handles pixel alignment and provision of the left portion to a first DWB scaling module 396 and of the right portion to a second DWB scaling module 398. Additional details regarding such operations are described below with respect to FIGS. 4 and 5.

The MPC module 300 also supports various additional operations for combining graphical frame layers provided via DPP pipelines 311, 313, 315, 317. For example, in some embodiments, output from one of the DPP pipelines 311, 313, 315, 317 is selected (via control line 306) as a top layer and alpha-blended with output from another of the DPP pipelines 311, 313, 315, 317 that is selected (via control line 308) as a bottom layer. To perform this blending of two layers from two different DPP pipelines, in certain embodiments the bottom layer is fed through one of the combiner modules (e.g., combiner module 330) and back to another combiner module's top layer MUX (e.g., top layer MUX 322) to be blended (e.g., via blending logic 326). In certain embodiments, each combiner module 320, 330, 340, 350, 360 is chained together to perform alpha blending on more than two layers. In the depicted embodiment, alpha values from the top layer are used for the alpha blending function; in other embodiments, alpha values from the bottom layer are utilized.

Figure 4:
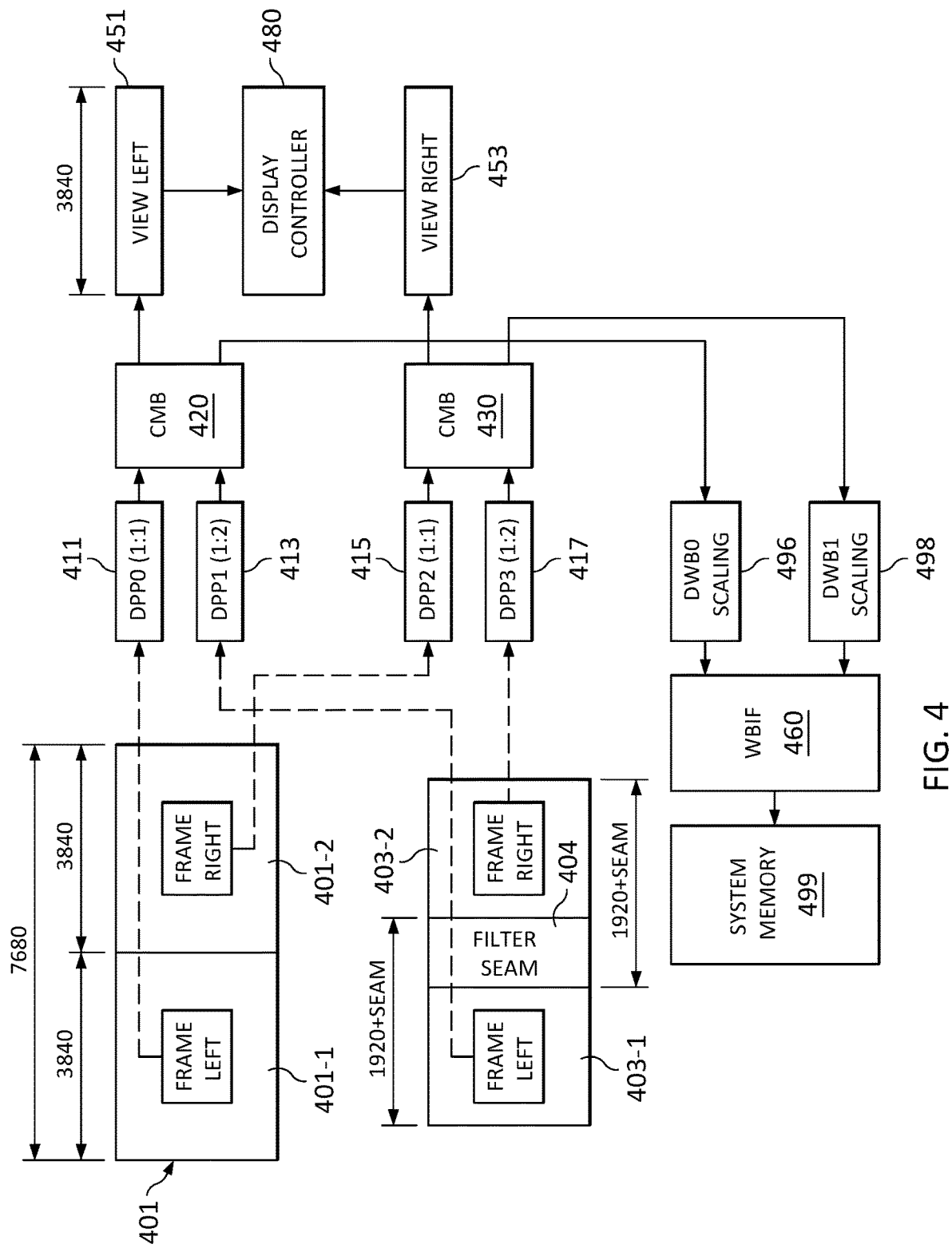
FIG. 4 depicts one example of operations to process high- or ultrahigh-resolution graphical frames as performed by a multi-pipe/plane combiner (MPC) circuitry module in accordance with some embodiments.

FIG. 4 depicts one example of operations to process ultrahigh resolution graphical frames as performed by an MPC circuitry module in accordance with one or more embodiments. In the depicted example, a pair of DWB scaling modules 496, 498 (DWB0 and DWB1, respectively) are configured to scan out graphical frames with a specified scale resolution at 60 Hz to a system memory 499 (such as to a frame buffer, DWB buffer, or other location in system memory) via a DWB memory interface 460. An exemplary 8 k-resolution graphical frame 401 (which has a horizontal resolution of 7680 pixels) is spatially segmented into left frame portion 401-1 and right frame portion 401-2 (collectively termed frame portions 401, each having a resulting horizontal resolution of 3840 pixels), each of which is respectively processed by DPP pipeline 411 (DPP0) and DPP pipeline 415 (DPP2) without scaling (i.e., with a scaling factor of 1:1). In the depicted embodiment, a downscaled instance of the left frame portion 401-1 is additionally generated as downscaled left frame portion 403-1 to include additional horizontal pixels corresponding to a filter seam 404 (which comprises a small quantity of pixels, typically between 1 and 256 pixels of each horizontal scan line, that are used to visually integrate the left and right portions during the blending process), and is further provided for processing by DPP pipeline 413 (DPP1) with an upscaling factor of 1:2. Similarly, a downscaled instance of the right frame portion 401-2 is generated as downscaled right frame portion 403-2 to include additional horizontal pixels corresponding to the filter seam 404, and is provided for processing by DPP pipeline 417 (DPP3) with an upscaling factor of 1:2. In various embodiments, the width of the filter seam 404 (e.g., 256 pixels or some other desired value) may be selected based on target quality parameters; in the depicted embodiment, a programmable filter seam width is used. It will be appreciated that in various embodiments, other fixed filter seam widths may be utilized.

In the depicted embodiment, the left frame portion 401-1 is provided to combiner module 420 as a top layer, with the downscaled left frame portion 403-1 being provided to that combiner module 420 as bottom layer. The combiner module 420 blends the top and bottom layers as a 4 k-resolution graphical frame and writes back blended output based on the left frame portion 401-1 and the downscaled left frame portion 403-1 to the DWB scaling module 496. In a similar manner, the right frame portion 401-2 is provided to combiner module 430 as a top layer, with the downscaled right frame portion 403-2 being provided to that combiner module 430 as bottom layer. The combiner module 430 blends the top and bottom layers as a 4 k-resolution graphical frame and writes back blended output (based on the right frame portion 401-2 and the downscaled right frame portion 403-2) to the DWB scaling module 498. In addition, the respective outputs of combiner modules 420 and 430 are provided for display as the left 4 k-resolution view 451 and the right 4 k-resolution view 453 via display controller 480 (such as may be communicatively coupled to a display screen, computer monitor, a touchscreen device, or other suitable display device).

It will be appreciated that in certain embodiments, scaling modules 496, 498 may be omitted, such that the DWB memory interface 460 receives the outputs of combiner modules 420, 430 at full 8 k resolution. In either case, the DWB memory interface 460 writes the received output of the combiner modules 420, 430 to system memory 499. In certain embodiments and scenarios, the output written to system memory 499 by the DWB memory interface 460 may be utilized for remote access.

Figure 5:
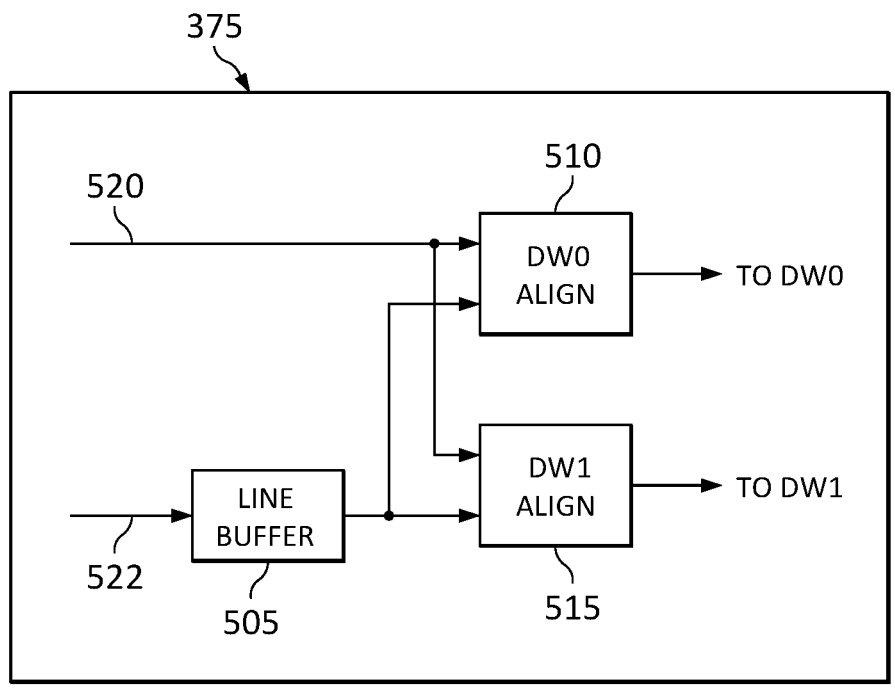
FIG. 5 illustrates a block diagram of a pixel alignment circuitry module in accordance with some embodiments.

FIG. 5 illustrates a block diagram of the pixel alignment circuitry module 375 of FIG. 3, which in the depicted embodiment handles pixel alignment and storage of segmented portions of a graphical frame in the DWB scaling modules 396, 398 for scaling to a desired destination resolution. In the depicted embodiment, the pixel alignment circuitry module 375 includes a line buffer 505, as well as two DWB alignment blocks 510, 515. The pixel alignment circuitry module 375 facilitates transfer to a destination DWB scaling module of at least one of the processed portions of the graphical frame with a spatial offset associated with the at least one processed portion. In this manner, the MPC system 300 provides for the correct positioning of the segmented portions within the larger context of the graphical frame.

For example, in the case of horizontally segmenting an 8 k-resolution graphical frame into two adjacent halves, each having a substantially 4 k resolution, the outputs of the MPC module (such as MPC module 300 of FIG. 3) are synchronized (such as via an on-the-go (OTG) timing generator or other facility) to provide two pixels per clock cycle to be provided to DWB scaling modules 396 and 398, respectively. Scan lines of incoming pixels are passed to either DWB alignment block 510 for pixels of the left half of the graphical frame (e.g., frame left portion 401-1 of FIG. 4) or to DWB alignment block 515 for pixels of the right half of the graphical frame (e.g., frame right portion 401-2 of FIG. 4). The line buffer 505 is used to store (and thereby delay) scan lines of pixels of the right half of the graphical frame, effectively providing an offset having a value in pixels of 0-L (where L is the capacity of the line buffer 505) in order to align those pixels accordingly for processing via DWB scaling module 398, which corresponds to the 4 k-resolution right half of the greater 8 k-resolution graphical frame. Thus, in this example the line buffer 505 has a total capacity of at least 3,840 pixels. In this manner, pixels of each half of the graphical frame are directed to a corresponding portion of the DWB scaling modules 396, 398.

Figure 6:
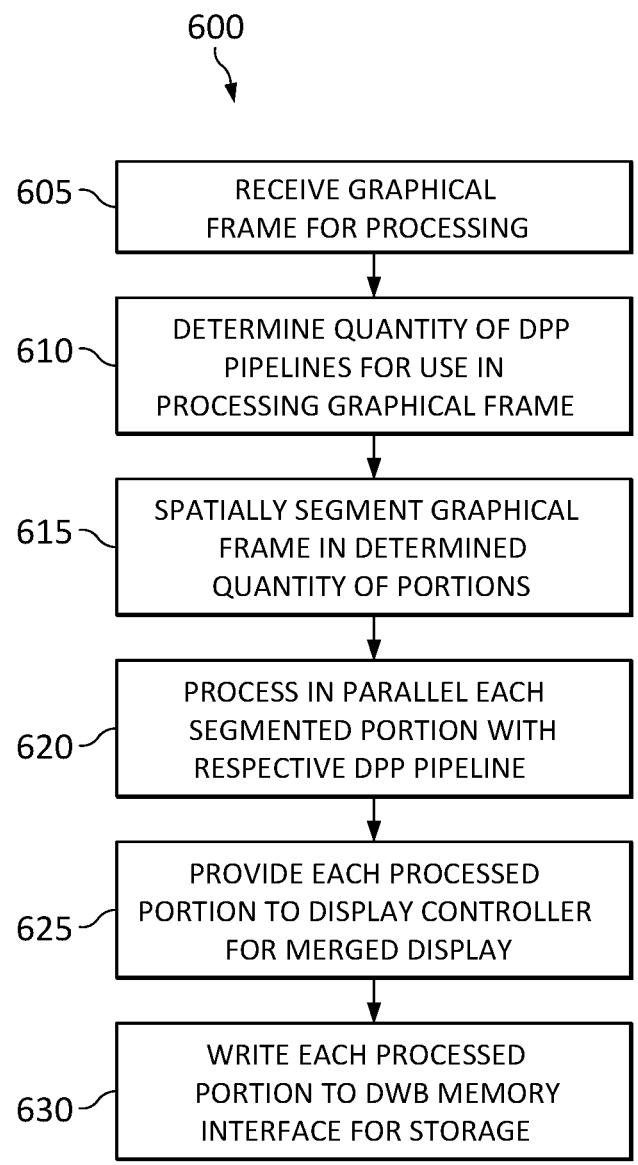
FIG. 6 illustrates an operational routine 600 that may be performed by a multi-pipe/plane combiner (MPC) circuitry module in accordance with some embodiments.

FIG. 6 illustrates an operational routine 600 that may be performed, for example, by an MPC module (such as MPC module 300 of FIG. 3) in accordance with one or more embodiments.

The routine begins at block 605, in which a graphical frame is received for processing. As described elsewhere herein, in various embodiments and scenarios the graphical frame may be associated with one or more images, with video content, etc. The routine proceeds to block 610.

At block 610, a quantity of DPP pipelines for use in processing the graphical frame is determined. In various embodiments, this determination may be based on one or more target service metrics, available bandwidth, available DPP pipelines, power requirements, a pixel resolution of the graphical frame, or other criteria. As one example, it may be determined to process a graphical frame having an ultrahigh resolution (such as 8 k resolution) by at least two DPP pipelines in order to lessen the pixel bandwidth associated with processing of the graphical frame by a single such DPP pipeline. The routine proceeds to block 615.

At block 615, the graphical frame is spatially segmented into a number of portions corresponding to the quantity of DPP pipelines to be used in processing the graphical frame, as determined in block 610. Spatially segmented graphical frame into multiple portions may be performed in a variety of manners, including to include or exclude a defined seam width of overlapping pixels associated with a border region between the spatially segmented portions. For purposes of this continuing example, the graphical frame is horizontally segmented into two portions of substantially equal dimension (e.g., two 4 k-resolution halves of the original 8 k-resolution graphical frame). The routine proceeds to block 620.

At block 620, each segmented portion of the graphical frame is processed in parallel by a respective DPP pipeline. As detailed elsewhere herein, in various embodiments such processing may include various operations, including to provide each processed portion of the graphical frame to a combiner module for blending and/or compositing of multiple layers. The routine proceeds to block 625.

At block 625, the routine provides each processed portion of the graphical frame to a display controller, such as for combined display on a communicatively coupled display device. The routine proceeds to block 630.

At block 630, each processed portion of the graphical frame is provided to a DWB memory interface for storage, such as by writing the processed portions of the graphical frame to a frame buffer, DWB buffer, or other location in system memory. In certain embodiments, the providing of each processed portion of the graphical frame may include operations to synchronize and/or offset the writing of one or more of the processed portions in order to align those portions as part of the incorporating graphical frame.

In some embodiments, the apparatus and techniques described above are implemented in a system including one or more integrated circuit (IC) devices (also referred to as integrated circuit packages or microchips), such as the MPC module described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving a graphical frame for processing; and
   responsive to determining that at least one pipeline of a plurality of pipelines is insufficient to process the graphical frame in accordance with one or more target service metrics:
   spatially segmenting the graphical frame into multiple non-overlapping portions;
   processing each of the multiple portions of the graphical frame by a respective pipeline of the plurality of pipelines; and
   writing each processed portion of the graphical frame to a corresponding portion of a system memory.

2. The method of claim 1, wherein writing each processed portion of the graphical frame to the corresponding portion of a system memory comprises writing each processed portion to a corresponding portion of a display writeback (DWB) buffer.

3. The method of claim 1, wherein the graphical frame has a vertical resolution and a horizontal resolution, and wherein spatially segmenting the graphical frame includes horizontally segmenting the graphical frame such that each of multiple portions of the graphical frame has the vertical resolution.

4. The method of claim 3, wherein the graphical frame has a first resolution, and wherein segmenting the graphical frame includes segmenting the graphical frame into two portions that each have a resolution that is approximately half of the first resolution.

5. The method of claim 1, wherein for at least one portion of the multiple portions, writing the processed portion of the graphical frame includes writing each of multiple scan lines of the processed portion with an offset associated with the at least one portion.

6. The method of claim 1, wherein writing each processed portion of the graphical frame to a corresponding portion of a system memory includes writing each processed portion to the system memory substantially simultaneously.

7. The method of claim 1, wherein spatially segmenting the graphical frame into multiple non-overlapping portions comprises including in at least one of the portions a defined seam width of pixels from a neighboring other portion of the multiple non-overlapping portions.

8. A system, comprising:
flow control interface circuitry to receive a graphical frame for processing;
control circuitry to, responsive to a determination that at least one graphical pipeline of a plurality of graphical pipelines is insufficient to process the graphical frame in accordance with one or more target service metrics, spatially segment the graphical frame into multiple non-overlapping portions and to provide each portion of the multiple portions to a respective graphical pipeline of the plurality of graphical pipelines for processing; and
one or more combiner circuitry modules to transfer processed portions of the graphical frame from each graphical pipeline of the plurality of graphical pipelines to a corresponding portion of a system memory, the corresponding portions of the system memory to store the processed portions of the graphical frame.

9. The system of claim 8, further comprising a display controller to substantially simultaneously display the processed portions of the graphical frame.

10. The system of claim 8, wherein the graphical frame has a vertical resolution and a horizontal resolution, and wherein the control circuitry is to horizontally segment the graphical frame such that each of the multiple portions of the graphical frame has the vertical resolution.

11. The system of claim 10, wherein the graphical frame has a first resolution, and wherein the control circuitry is to segment the graphical frame into two portions that each have a resolution that is approximately half of the first resolution.

12. The system of claim 8, further comprising pixel alignment circuitry to transfer each of multiple scan lines of at least one of the processed portions to the system memory with an offset associated with the at least one processed portion.

13. The system of claim 8, wherein the one or more combiner circuitry modules write each of the processed portions to the corresponding portion of the system memory substantially simultaneously.

14. The system of claim 8, wherein the control circuitry is to spatially segment the graphical frame into multiple substantially non-overlapping portions that overlap by a quantity of pixels.

15. The system of claim 8, wherein the determination that the at least one graphical pipeline is insufficient is based at least in part a pixel resolution of the graphical frame.

16. A non-transitory computer-readable medium storing a set of executable instructions to manipulate a processing system to perform a method for processing graphical content for display, the method comprising:
receiving a graphical frame for processing; and
responsive to determining that at least one pipeline of a plurality of pipelines is insufficient to process the graphical frame in accordance with one or more target service metrics:
spatially segmenting the graphical frame into multiple non-overlapping portions;
processing each of the multiple portions of the graphical frame by a respective pipeline of the plurality of pipelines; and
writing each processed portion of the graphical frame to a corresponding portion of a system memory.

17. The non-transitory computer-readable medium of claim 16, wherein writing each processed portion of the graphical frame to the corresponding portion of a system memory comprises writing each processed portion to a corresponding portion of a display writeback (DWB) buffer.

18. The non-transitory computer-readable medium of claim 16, wherein the graphical frame has a vertical resolution and a horizontal resolution, and wherein spatially segmenting the graphical frame includes to horizontally segment such that each of multiple portions of the graphical frame has the vertical resolution.

19. The non-transitory computer-readable medium of claim 18, wherein the graphical frame has a first resolution, and wherein spatially segmenting the graphical frame includes segmenting the graphical frame into two portions that each have a resolution that is approximately half of the first resolution.

20. The non-transitory computer-readable medium of claim 16, wherein for at least one portion of the multiple portions, writing the processed portion of the graphical frame includes writing each of multiple scan lines of the processed portion with an offset associated with the at least one portion.

21. The non-transitory computer-readable medium of claim 16, wherein writing each processed portion of the graphical frame to a corresponding portion of a system memory includes writing each processed portion to the system memory substantially simultaneously.

22. The non-transitory computer-readable medium of claim 16, wherein determining that the at least one pipeline is insufficient to process the graphical frame is based at least in part a pixel resolution of the graphical frame.

* * * * *